United States Patent
Park et al.

(10) Patent No.: US 10,565,435 B2
(45) Date of Patent: Feb. 18, 2020

(54) APPARATUS AND METHOD FOR DETERMINING VIDEO-RELATED EMOTION AND METHOD OF GENERATING DATA FOR LEARNING VIDEO-RELATED EMOTION

(71) Applicant: ELECTRONICS AND TELECOMMUNICATIONS RESEARCH INSTITUTE, Daejeon (KR)

(72) Inventors: Jee Hyun Park, Daejeon (KR); Jung Hyun Kim, Daejeon (KR); Yong Seok Seo, Daejeon (KR); Won Young Yoo, Daejeon (KR); Dong Hyuck Im, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 100 days.

(21) Appl. No.: 15/992,398

(22) Filed: May 30, 2018

(65) Prior Publication Data
US 2019/0278978 A1 Sep. 12, 2019

(30) Foreign Application Priority Data
Mar. 8, 2018 (KR) .................. 10-2018-0027637

(51) Int. Cl.
*G06K 9/00* (2006.01)
*G06K 9/66* (2006.01)
(Continued)

(52) U.S. Cl.
CPC ......... *G06K 9/00302* (2013.01); *G06F 16/71* (2019.01); *G06F 16/7834* (2019.01); *G06K 9/6267* (2013.01); *G06K 9/66* (2013.01)

(58) Field of Classification Search
CPC .... G06K 9/00302; G06K 9/66; G06K 9/6267; G06F 16/71; G06F 16/7834
See application file for complete search history.

(56) References Cited

U.S. PATENT DOCUMENTS 7,179,980 B2   2/2007   Kirkeby et al.
8,489,606 B2   7/2013   Lee et al.
(Continued)

FOREIGN PATENT DOCUMENTS

KR   10-2011-0020158 A   2/2011
KR   10-2011-0099590 A   9/2011
(Continued)

*Primary Examiner* — Aaron W Carter
(74) *Attorney, Agent, or Firm* — LRK Patent Law Firm (57) ABSTRACT

A method for determining a video-related emotion and a method of generating data for learning video-related emotions include separating an input video into a video stream and an audio stream; analyzing the audio stream to detect a music section; extracting at least one video clip matching the music section; extracting emotion information from the music section; tagging the video clip with the extracted emotion information and outputting the video clip; learning video-related emotions by using the at least one video clip tagged with the emotion information to generate a video-related emotion classification model; and determining an emotion related to an input query video by using the video-related emotion classification model to provide the emotion.

17 Claims, 9 Drawing Sheets

(51) Int. Cl.
*G06K 9/62* (2006.01)
*G06F 16/71* (2019.01)
*G06F 16/783* (2019.01)

(56) References Cited

U.S. PATENT DOCUMENTS

| | | | |
|---|---|---|---|
| 8,838,617 B2 | 9/2014 | Kim et al. | |
| 9,183,840 B2* | 11/2015 | Lee | G10L 19/018 |
| 9,788,777 B1* | 10/2017 | Knight | A61B 5/165 |
| 9,888,279 B2* | 2/2018 | Ishtiaq | H04N 21/23418 |
| 9,961,403 B2* | 5/2018 | Kritt | G06F 3/0484 |
| 2006/0122842 A1* | 6/2006 | Herberger | G10H 1/368 |
| | | | 704/278 |
| 2008/0040362 A1* | 2/2008 | Aucouturier | G06F 16/68 |
| 2009/0067605 A1* | 3/2009 | Holm | G06T 13/205 |
| | | | 379/207.16 |
| 2010/0145892 A1* | 6/2010 | Yang | G06F 16/639 |
| | | | 706/12 |
| 2012/0054238 A1* | 3/2012 | Lee | G06F 16/686 |
| | | | 707/771 |
| 2012/0124473 A1* | 5/2012 | Kim | G11B 27/105 |
| | | | 715/716 |
| 2012/0233164 A1* | 9/2012 | Rowe | G06F 16/639 |
| | | | 707/737 |
| 2012/0316660 A1* | 12/2012 | Luo | G06F 16/78 |
| | | | 700/94 |
| 2013/0031107 A1* | 1/2013 | Pan | G06F 16/435 |
| | | | 707/749 |
| 2013/0132988 A1* | 5/2013 | Lee | H04N 21/4394 |
| | | | 725/14 |
| 2013/0138684 A1* | 5/2013 | Kim | G06F 16/683 |
| | | | 707/769 |
| 2014/0016789 A1* | 1/2014 | Lee | G10L 19/018 |
| | | | 381/56 |
| 2014/0181668 A1* | 6/2014 | Kritt | G06F 3/0484 |
| | | | 715/719 |
| 2015/0297109 A1* | 10/2015 | Garten | A61B 5/04845 |
| | | | 600/544 |
| 2016/0163354 A1* | 6/2016 | Eggink | G11B 27/105 |
| | | | 386/241 |
| 2017/0047096 A1* | 2/2017 | Li | G11B 27/34 |
| 2018/0144746 A1* | 5/2018 | Mishra | G10L 25/51 |
| 2018/0184179 A1* | 6/2018 | Rankine | G11B 27/105 |
| 2019/0138546 A1* | 5/2019 | Jung | G06N 20/00 |
| 2019/0244639 A1* | 8/2019 | Benedetto | G11B 27/34 |
| 2019/0266406 A1* | 8/2019 | Tang | G06F 16/739 |
| 2019/0278978 A1* | 9/2019 | Park | G06F 16/71 |
| 2019/0294668 A1* | 9/2019 | Goel | G06F 17/2775 |

FOREIGN PATENT DOCUMENTS

| | | |
|---|---|---|
| KR | 10-1520572 B1 | 5/2015 |
| KR | 10-2015-0092591 A | 8/2015 |
| KR | 10-2016-0060803 A | 5/2016 |

* cited by examiner

APPARATUS AND METHOD FOR DETERMINING VIDEO-RELATED EMOTION AND METHOD OF GENERATING DATA FOR LEARNING VIDEO-RELATED EMOTION

CROSS REFERENCE TO RELATED APPLICATION

This application claims priority to Korean Patent Application No. 10-2018-0027637, filed Mar. 8, 2018 in the Korean Intellectual Property Office (KIPO), the entire content of which is hereby incorporated by reference.

BACKGROUND

1. Technical Field

Example embodiments of the present invention relate to an apparatus and method for determining a video-related emotion and method of generating data for learning video-related emotions, and more specifically, to a method of generating data for learning video-related emotions by using music included in a video, a method of determining a video-related emotion, and an apparatus for determining a video-related emotion by using the methods.

2. Description of Related Art

In various fields, results that overcome limitations of existing technology by using deep learning are lately being proposed. Deep learning is technology that enables a computer to have its own determination capability by making the computer learn a large amount of data, similar to how humans acquire an ability to make determinations about objects through learning and experience.

Deep learning may be classified into supervised learning and unsupervised learning. In supervised learning, data and answers are provided together for learning. For example, to generate a classifier for distinguishing between dogs and cats, learning is performed by providing, in pairs, photographic images of cats and information indicating cats, and photographic images of dogs and information indicating dogs. In unsupervised learning, only photographs of cats and dogs are provided, without information related to the photographs, and then learning is performed so that a computer may distinguish between cats and dogs. In most cases, supervised learning shows better performance than unsupervised learning, but it is difficult to prepare a large amount of training data consisting of data and answers. Since the performance of deep learning significantly depends on the quantity and quality of data used for learning, a composition of training data is very important. In other words, the preparation of training data may require the longest time and the highest cost in the application of technology which uses deep learning.

Due to such a problem in obtaining training data, an approach in which a facial expression of a person who views a video is recognized to determine a video-related emotion is currently being used in the field of video-related emotion classification rather than an approach in which deep learning is used. However, since the approach has both a privacy problem and a cost problem, it is difficult for the approach to be commonly used.

SUMMARY

Accordingly, example embodiments of the present invention are provided to substantially obviate one or more problems due to limitations and disadvantages of the related art.

Accordingly, embodiments of the present disclosure provide a method for determining a video-related emotion.

Accordingly, embodiments of the present disclosure provide a method of generating video-related emotion training data.

Accordingly, embodiments of the present disclosure provide an apparatus for determining a video-related emotion.

In order to achieve the objective of the present disclosure, a method for determining a video-related emotion and method of generating data for learning video-related emotions may comprise separating an input video into a video stream and an audio stream; analyzing the audio stream to detect a music section; extracting at least one video clip matching the music section; extracting emotion information from the music section; tagging the video clip with the extracted emotion information and outputting the video clip; learning video-related emotions by using the at least one video clip tagged with the emotion information to generate a video-related emotion classification model; and determining an emotion related to an input query video by using the video-related emotion classification model to provide the emotion.

The extracting of the emotion information from the music section may comprise determining whether the music section includes voice; when voice is included in the music section, removing the voice from the music section and acquiring a music signal; and extracting music-related emotion information from the acquired music signal.

The extracting of the at least one video clip matching the music section may comprise: selecting a video section corresponding to time information of the detected music section; and separating the selected video section to generate at least one video clip.

The tagging of the video clip with the extracted emotion information and the outputting of the video clip may comprise inserting the emotion information into a metadata area of the video clip and outputting the video clip.

The tagging of the video clip with the extracted emotion information and the outputting of the video clip may comprise storing the emotion information in a separate file and outputting the video clip and the separate file.

The tagging of the video clip with the extracted emotion information and the outputting of the video clip may comprise inputting the emotion information to an emotion information database.

In order to achieve the objective of the present disclosure, a method of generating video-related emotion training data may comprise separating an input video into a video stream and an audio stream; detecting music sections in the separated audio stream; removing voice from the music sections to acquire music signals; extracting music-related emotion information from the acquired music signals; and tagging a corresponding video clip with music-related emotion information corresponding to each music section.

Here, a plurality of video clips tagged with the music-related emotion information are provided as video-related emotion training data.

The method of generating video-related emotion training data may further comprise detecting a video section matching each music section, and separating the detected video section to generate a video clip related to at least one scene.

The music emotion information tagged to the video clip is stored in a metadata area of the video clip, a separate file, or an emotion information database.

In order to achieve the objective of the present disclosure, an apparatus for determining a video-related emotion may comprise a processor, and a memory configured to store at least one command executed by the processor, wherein the at least one command includes: a command to separate an input video into a video stream and an audio stream; a command to detect music sections by analyzing the audio stream; a command to extract at least one video clip matching the music sections; a command to extract emotion information from the music sections; a command to tag the video clip with the extracted emotion information and output the video clip; a command to learn video-related emotions by using a plurality of video clips tagged with emotion information and generate a video-related emotion classification model; and a command to determine an emotion related to an input query video by using the video-related emotion classification model and provide the emotion.

The apparatus for determining a video-related emotion may further comprise a database configured to store the plurality of video clips and the plurality of pieces of emotion information related to the plurality of video clips.

The command to extract the emotion information from the music sections may include a command to determine whether the music sections include voice; a command to, when voice is included in the music sections, remove the voice from the music sections and acquire music signals; and a command to extract music-related emotion information from the acquired music signals.

The command to extract the at least one video clip matching the music section may include: a command to select video sections corresponding to time information of the detected music sections; and a command to generate at least one video clip by separating the selected video sections.

The command to extract the at least one video clip matching the music sections may include a command to detect a video section matching each music section and generate a video clip related to at least one scene by separating the detected video section.

The emotion information tagged to the video clip may be stored in a metadata area of the video clip or in a separate file.

The command to tag the video clip with the extracted emotion information and output the video clip may include: a command to determine a position in a metadata area to which the emotion information will be inserted by parsing and analyzing the metadata area of the input video; and a command to insert the emotion information to the determined position in the metadata area.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiments of the present invention will be described in detail with reference to the accompanying drawings.

Figure 1:
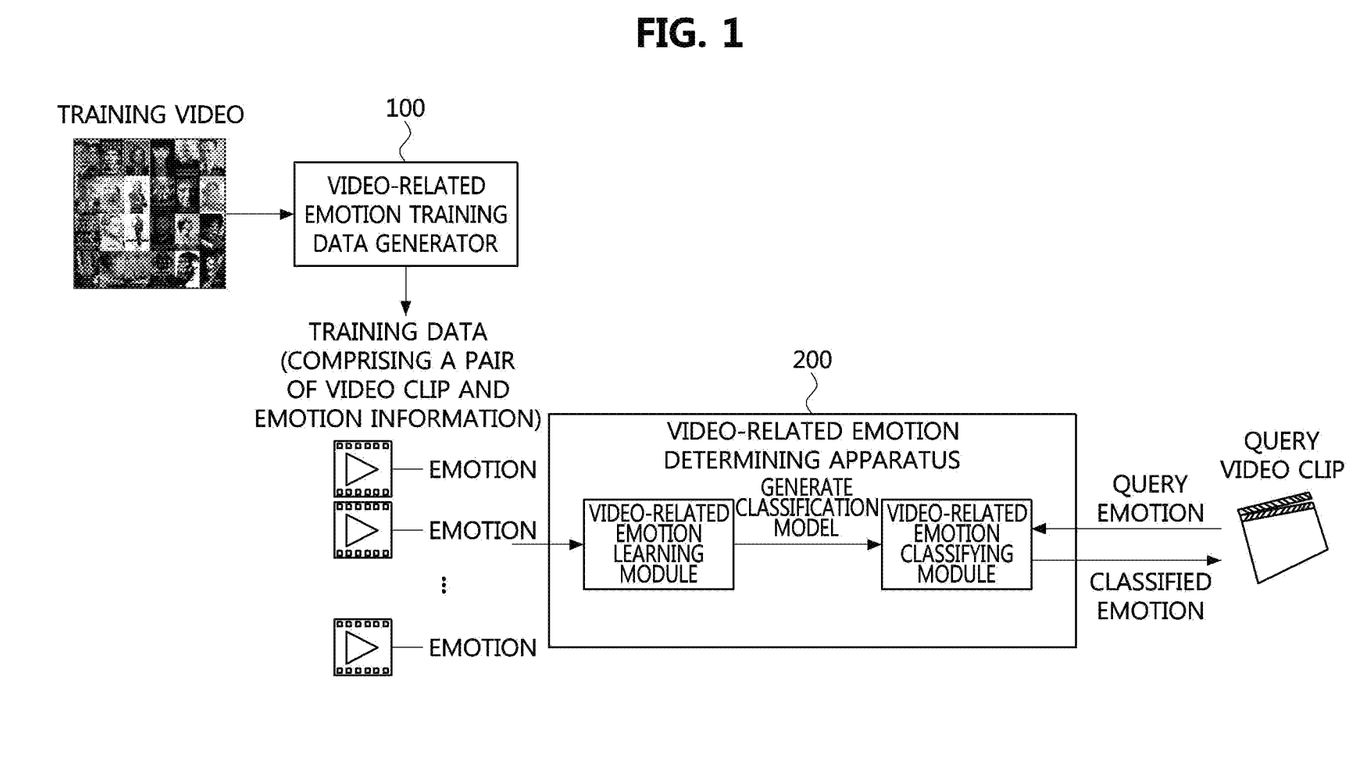
FIG. 1 is a schematic conceptual view of an apparatus for determining a video-related emotion according to an example embodiment of the present invention.

FIG. 1 is a schematic conceptual view of an apparatus for determining a video-related emotion according to an example embodiment of the present invention.

The apparatus for determining a video-related emotion according to an example embodiment of the present invention may include a video-related emotion training data generator 100 which receives training videos, divides the videos into clips which are small units, and outputs emotion values of the respective clips, and a video-related emotion determining apparatus 200 which learns video-related emotions by using training data generated by the video-related emotion training data generator 100 to generate a video-related emotion classification model and classifies video-related emotions according to the video-related emotion classification model.

The video-related emotion training data generator 100 may separate an input video into a video stream and an audio stream, extract at least one video clip matching a music section, extract emotion information from the music section, tag the video clip with the extracted emotion information, and output the video clip.

The video-related emotion determining apparatus 200 may learn video-related emotions by using at least one video clip, which is output by the video-related emotion training data generator 100 and tagged with emotion information, to generate a video-related emotion classification model, may determine an emotion related to a query video by using the video-related emotion classification model, and provide the determined emotion.

Here, video-related emotion training data according to an example embodiment of the present invention may have a form of data comprising a pair of video clip and emotion information.

More specifically, the video-related emotion determining apparatus 200 classifies video-related emotions on the basis of deep learning. The video-related emotion determining apparatus 200 may learn video-related emotions by using a large amount of training data to generate a video classification model and may determine video-related emotions related to an arbitrary input video by using the generated video classification model.

A representative deep learning field is the field of understanding the content of videos. In other words, use of deep learning enables a computer to automatically understand the content of videos and describe the content in text, similar to a person viewing a video and understanding the video content, such as kinds of objects, motions of objects, places, emotions, etc. included in the video.

When an attempt is made to understand the content of videos, there are already multiple pieces of text information regarding, for example, the kinds, motions, etc. of objects which are visually recognizable, and thus it is easy to compose training data. On the other hand, there are not many pieces of text information regarding video-related emotion information, such as feelings or atmospheres of videos. Existing text information related to emotion is genre information of videos and the like. However, genre information is only representative information of each whole video and does not describe emotion information of partial sections of the video. As an example, even a horror film may include therein many scenes opposite to the feeling of fear, such as joyful scenes, lovely scenes, happy scenes, etc.

Training data in which an emotion related to each scene of a video is indicated by a person is required for learning through deep learning so that an emotion related to each scene constituting a video may be classified. Here, a scene of a video denotes each partial section representing one story in the video. A large amount of training data is required for learning, and it is very difficult for a person to divide a video into scenes and classify an emotion related to each scene in terms of time and cost. Therefore, an example embodiment of the present invention provides the video-related emotion training data generator 100 for effectively generating a large amount of training data.

The performance of a video-related emotion determining apparatus using deep learning depends on the quantity and quality of training data. In general, the more training data, the better the performance of a video-related emotion determining apparatus. In other words, when a video-related emotion determining apparatus performs learning, the performance of a system is greatly affected by provision of a large amount of training data.

Figure 2:
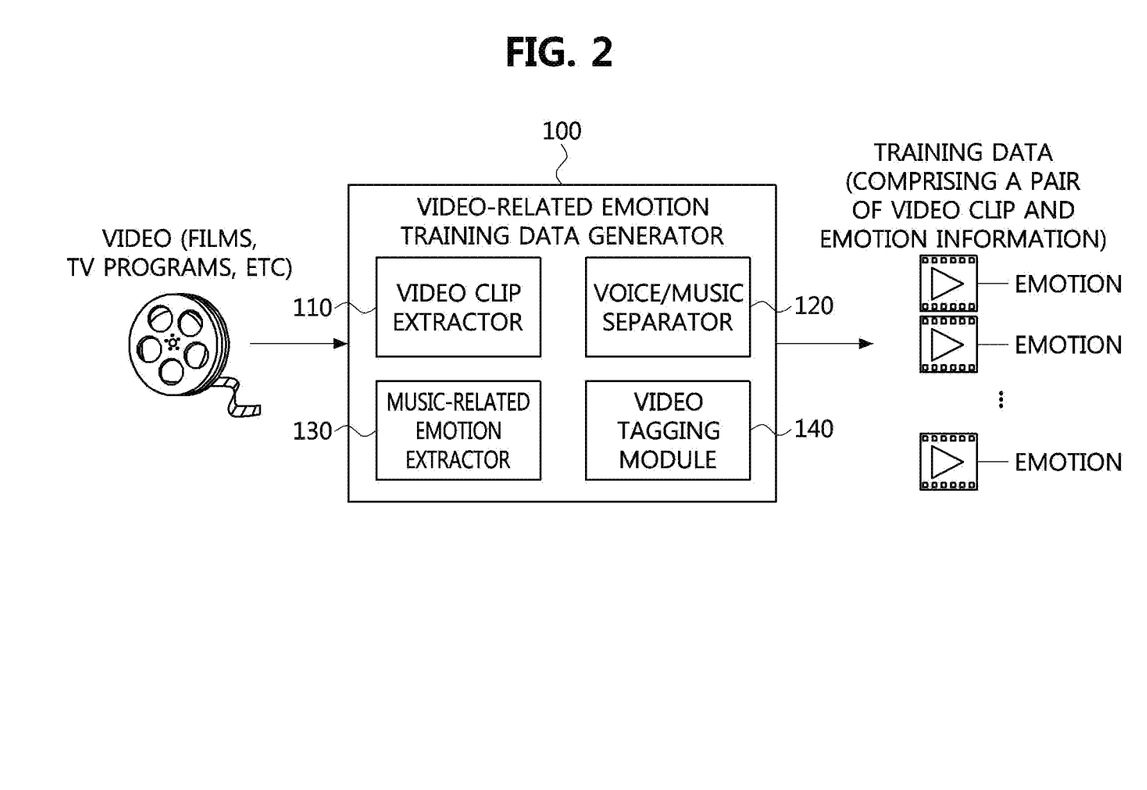
FIG. 2 is a block diagram of a video-related emotion training data generator according to an example embodiment of the present invention.

FIG. 2 is a block diagram of a video-related emotion training data generator according to an example embodiment of the present invention.

The video-related emotion training data generator 100 receives videos, such as films, television (TV) programs, etc., and outputs training data including video clip and emotion information pairs.

The video-related emotion training data generator 100 includes a video clip extractor 110 for clipping a section including music in an input video into a video clip, a voice/music separator 120 for separating music from speech when speech and music coexist in the video clip, a music-related emotion extractor 130 for classifying emotion information regarding the music in the video clip, and a video tagging module 140 for tagging the extracted music-related emotion information with the emotion information of the video clip.

Here, the video clip extractor 110 may include a video and audio stream separator for separating the input video into video and audio streams, a music section extractor for searching for and extracting a music section from the audio stream, a video section selector for selecting a section of the video stream corresponding to a time of the music section, and a video clip generator generating the selected video section as one video clip by separating the selected video section.

Figure 3:
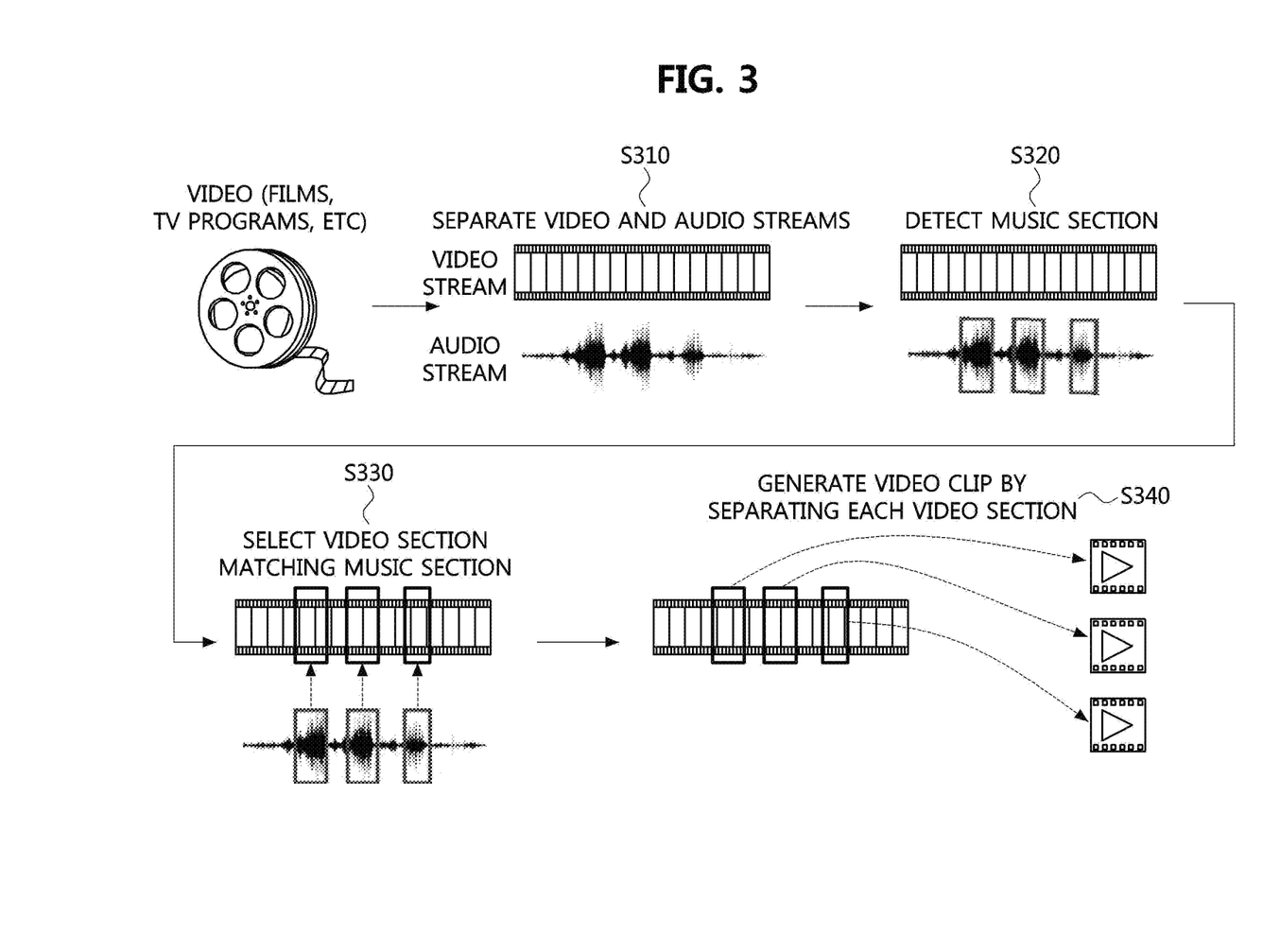
FIG. 3 is an operational flowchart conceptually showing a method of extracting a video clip according to an example embodiment of the present invention.

FIG. 3 is an operational flowchart conceptually showing a method of extracting a video clip according to an example embodiment of the present invention.

FIG. 3 shows a detailed process in which the video clip extractor generates respective video clip files from respective video scenes. The video clip extractor first separates an input video into a video stream and an audio stream (S310). Subsequently, the video clip extractor detects sections including music by analyzing the separated audio stream and acquires running time information of the detected music sections (S320). When the music sections are detected, the video clip extractor selects sections matching time information of the respective music sections in the video stream (S330). The video clip extractor generates respective video clip files by separating the selected sections of the video stream from each other (S340).

Figure 4:
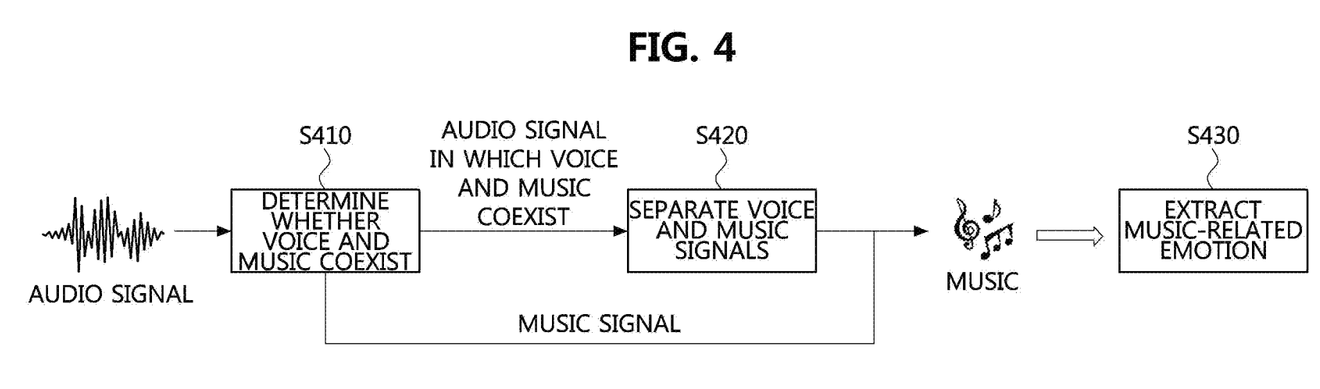
FIG. 4 is a conceptual view of a method of processing an audio signal according to an example embodiment of the present invention.

FIG. 4 is a conceptual view of a method of processing an audio signal according to an example embodiment of the present invention.

A procedure of processing an audio signal shown in FIG. 4 illustrates operation of the voice/music separator and the music-related emotion extractor according to an example embodiment of the present invention.

The voice/music separator detects a section in which voice and music coexist in a music section extracted by the music section extractor of the video clip extractor, separates and removes voice from the section, and outputs music components.

Music added to a film or a TV program serves to emphasize the atmosphere of a scene and mostly coexists with speech. Existing music-related emotion classification technologies have been intended for pure music data, and thus may not accurately classify an emotion related to music which coexists with speech. Therefore, according to an example embodiment of the present invention, the voice (speech) of an actor or actress is removed from an audio stream in which music and speech coexist, and only a music signal is extracted, so that the performance of music-related emotion classification may be improved.

In the present invention, independent component analysis (ICA), non-negative matrix factorization (NMF), deep learning, etc. may be used as a method of separating music from voice, and the method is not limited to the aforementioned specific algorithms.

ICA is used to separate mixed signals from each other, and is a computational method for separating a multivariate signal into subcomponents which are statistically independent from each other. ICA is mainly used in the field of speaker recognition. Since the content of films or dramas has many scenes in which voice and music coexist, it is possible to improve speaker recognition performance by removing music components and separating human voices. In the present invention, ICA is used to remove voice components instead of music components and to separate music only. Since the content of films or dramas is generally in stereo, it is possible to separate sound sources by using ICA.

NMF is a method of decomposing a non-negative matrix into the product of a basis matrix W and an activation matrix H, and is used to separate several signals. This technology is mainly used to improve voice recognition performance by separating a voice signal including noise into voice and noise. In the present invention, NMF may be used to separate voice and music.

Referring to FIG. 4, in an audio processing procedure according to an example embodiment of the present invention, an input audio signal is separated into voice and music. An audio section, which has been determined as a music section through the above-described music section detection process, is received as an input, and it is determined whether voice and music coexist in the corresponding audio signal (S410). When the audio signal is a pure music signal, the audio signal is output as it is without being processed. When voice and music coexist in the input audio signal, voice and music are separated from each other, and only a music signal is output (S420).

Subsequently, in a music-related emotion extraction operation (S430) performed by the music-related emotion extractor, an emotion related to each music section is classified. To classify a music-related emotion, for example, a probability distribution of emotions in which values of positive or negative emotional valence and emotional arousal are used may be used.

To emphasize a joyful or sad atmosphere, background music is frequently added to video content such as dramas and films. Since most added music matches emotions related to corresponding scenes, it is possible to determine an emotion related to a scene by finding out an emotion related to corresponding music. Various methods for classifying music-related emotions have been researched and are being applied to and used in actual services. In other words, classification of music-related emotions is easier than classification of video-related emotions, and there are various available methods for classifying music-related emotions.

Here, a method using an arousal-valence (AV) model may be used as a detailed method for extracting a music-related emotion. The AV model is an emotion model which uses a two-dimensional (2D) emotion space representing positive or negative emotional valence and emotional arousal. Emotional arousal represents the degree of emotional excitement and calmness. A higher value denotes a body feeling nervous tension, and a lower value denotes a feeling of calmness. Also, positive and negative emotional valence denotes a good feeling with a higher value and denotes a bad feeling with a lower value. In other words, a person's emotion is changed by positive and negative valence and the degree of arousal, and it is possible to determine a person's emotion by finding out the degree of such an emotional reaction.

When the AV model is used, it is possible to generate an emotion classification model in which similar emotion types are grouped together by using a distribution matrix which represents types of emotions felt by people from a plurality of pieces of music, and to detect a range of an AV coefficient corresponding to a specific emotion type by using the generated emotion classification model. Here, the AV coefficient may be calculated through regression analysis using mel-frequency cepstral coefficients (MFCCs), octave-based spectral contrast (OSC), energy, tempos, etc. of the respective piece of music.

However, a method for determining a music-related emotion according to an example embodiment of the present invention is not limited to the above-described method or a specific method.

Figure 5:
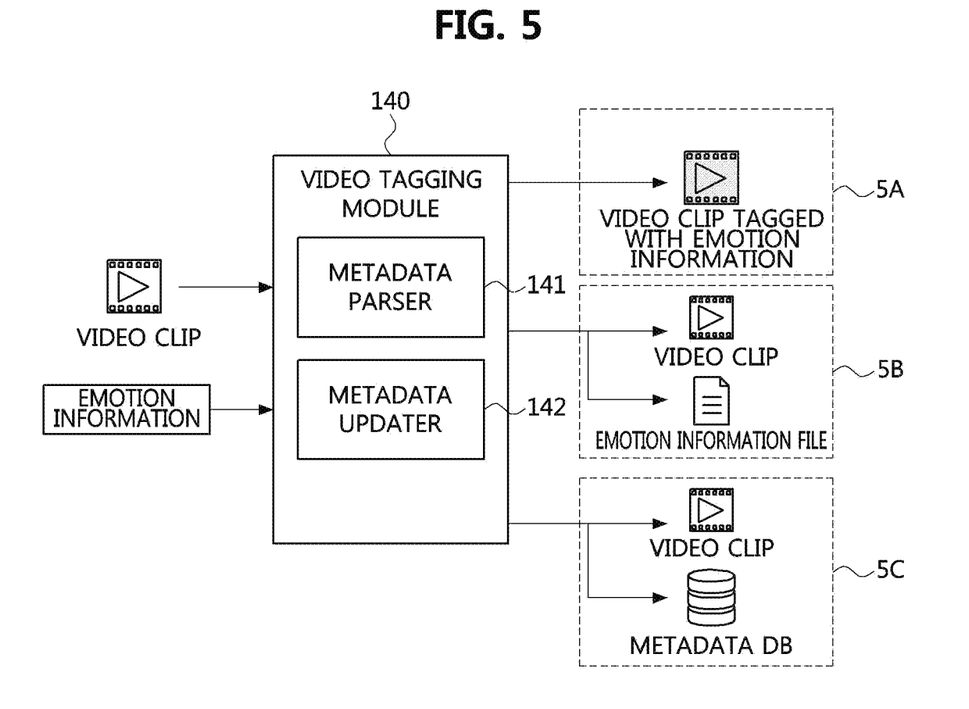
FIG. 5 is a block diagram of a video tagging module according to an example embodiment of the present invention.

FIG. 5 is a block diagram of a video tagging module according to an example embodiment of the present invention.

The video tagging module serves to tag each video clip generated by the video clip extractor with a music-related emotion value of the corresponding video clip classified by the music-related emotion extractor as an emotion value of the corresponding video clip.

FIG. 5 shows that information output by the video tagging module 140 may have three example forms according to methods for tagging a video with emotion information.

In a first example 5A output by the video tagging module 140, emotion information is directly written in a metadata area of a video. In a second example 5B, separate files are used to record a video and video-related emotion information. In a third example SC, emotion information of each video clip is input to a database.

Meanwhile, the video tagging module 140 may include a metadata parser 141 and a metadata updater 142. The metadata parser 141 determines a position in a metadata area to which emotion information will be inserted by parsing and analyzing the metadata area of an input video. The metadata updater 142 updates metadata of the video by inserting emotion information at the position in the metadata area determined by the metadata parser 141.

Figure 6:
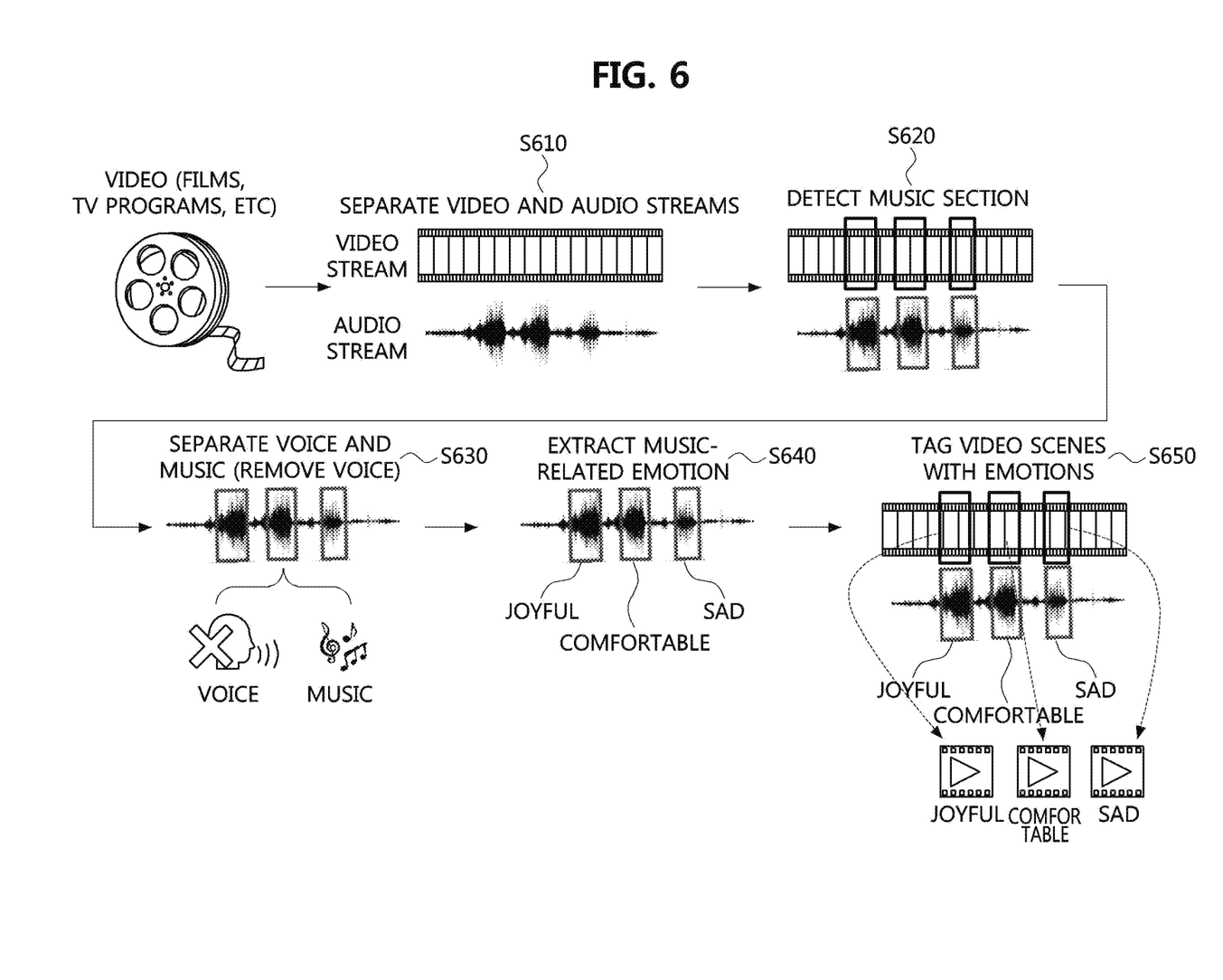
FIG. 6 is a diagram conceptually showing the entire operation sequence of a method of determining a video-related emotion according to an example embodiment of the present invention.

FIG. 6 is a diagram conceptually showing the entire operation sequence of a method of determining a video-related emotion according to an example embodiment of the present invention.

Although the method of determining a video-related emotion according to an example embodiment of the present invention illustrated in FIG. 6 may be performed by an apparatus for determining a video-related emotion, a subject of the operation is not limited thereto.

First, the apparatus for determining a video-related emotion separates an input video into a video stream and an audio stream (S610). Subsequently, the apparatus searches for sections including music by analyzing the separated audio stream, and detects music sections by acquiring running time information of found sections (S620).

The apparatus examines whether voice and music coexist in audio sections determined as the music sections, and acquires a music signal by separating voice and music signals from each other and removing the voice signal when an audio signal in which voice and music coexist has been input (S630).

Subsequently, the apparatus extracts music-related emotions from the acquired music signal (S640), and tags a video clip corresponding to each music section with a music-related emotion corresponding to the music section (650).

A video clip file and emotion information pair generated through the above-described process may be used as data for learning video-related emotion information.

Figure 7A:
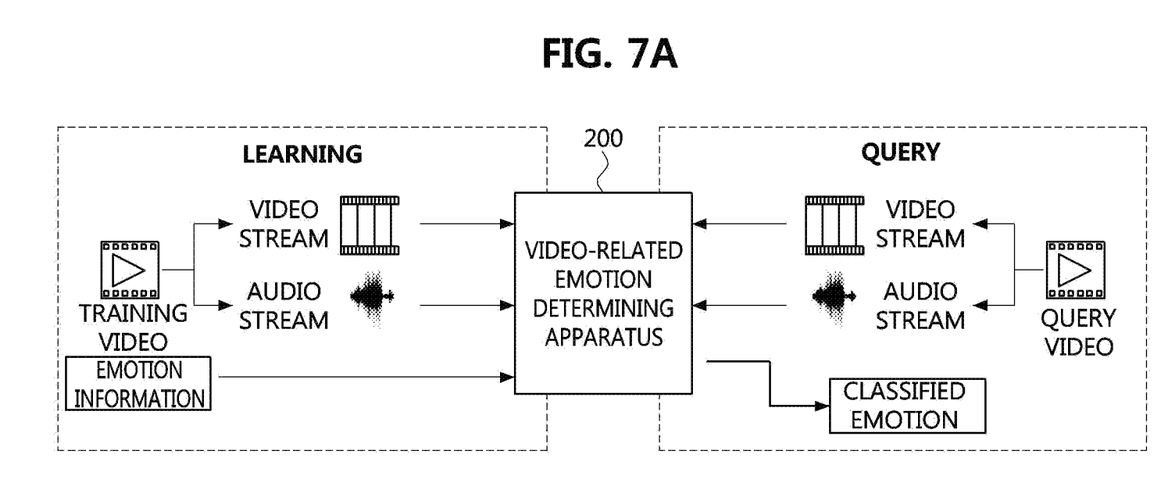
FIG. 7A shows an example of performing video-related emotion learning and querying by using video-related emotion training data generated according to an example embodiment of the present invention.

FIG. 7A shows an example of performing video-related emotion learning and querying by using video-related emotion training data generated according to an example embodiment of the present invention.

As shown in the example embodiment of FIG. 7A, when video-related emotions are learned according to the present invention, it is possible to use video and audio signals of a video together with emotion information. The video-related emotion determining apparatus 200 may learn video-related emotions, receive a video-related emotion query including video and audio signals, and output emotion information matching a corresponding video.

Figure 7B:
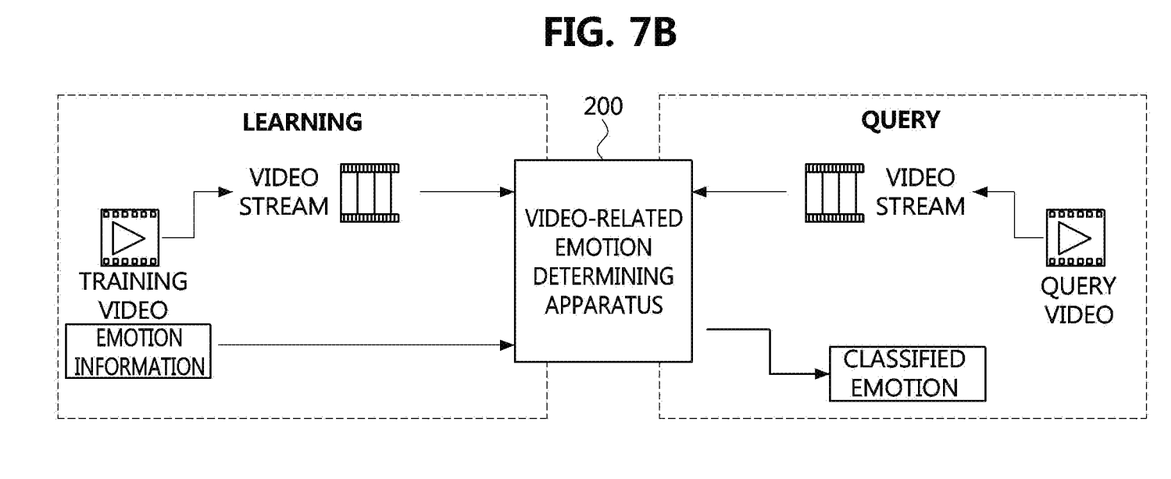
FIG. 7B shows another example of performing video-related emotion learning and querying by using video-related emotion training data generated according to an example embodiment of the present invention.

FIG. 7B shows another example of performing video-related emotion learning and querying by using video-related emotion training data generated according to an example embodiment of the present invention.

The example embodiment of FIG. 7B shows a case in which video-related emotions are learned by using a video signal of a video together with emotion information and an emotion query video also includes a video signal.

In a process of generating training data, emotion information is extracted from audio data, and thus both video and audio signals are required, but the learning process shown in FIG. 7B does not require any audio signal. Also, in responding to a query about a video-related emotion, no audio signal is required for a process of extracting a video-related emotion by using the video-related emotion determining apparatus 200 which has undergone learning. Therefore, even when an emotion related to a video section including no music is queried, it is possible to determine the emotion by using only a video signal.

Figure 8:
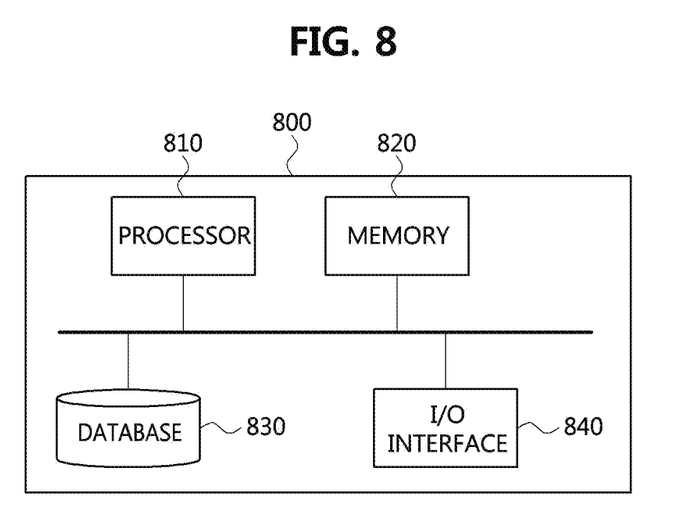
FIG. 8 is a block diagram of an apparatus for determining a video-related emotion according to an example embodiment of the present invention.

FIG. 8 is a block diagram of an apparatus for determining a video-related emotion according to an example embodiment of the present invention.

An apparatus 800 for determining a video-related emotion according to an example embodiment of the present invention may include a processor 810, a memory 820 for storing at least one command which is executed by the processor 810, a database 830, and an input/output (I/O) interface 840.

The at least one command stored in the memory 820 may include a command to separate an input video into a video stream and an audio stream, a command to detect sections including music by analyzing the audio stream, a command to extract at least one video clip matching the music sections, a command to extract emotion information from the music sections, a command to tag video clips with the extracted emotion information and output the video clips, a command to learn video-related emotion by using the plurality of video clips tagged with the emotion information and generate a video-related emotion classification model, and a command to determine an emotion related to an input query video by using the video-related emotion classification model and provide the emotion.

The database 830 may store a plurality of video clips and a plurality of pieces of emotion information related to the plurality of video clips. Also, the database 830 may store a video-related emotion classification model which is generated by learning video-related emotions.

The I/O interface 840 provides an interface for interoperating with at least one external device, receives training videos and a query video clip from external devices, transfers the received training videos and query video clip to the processor 810, receives emotion information determined by the processor 810, and transmits the received emotion information to an external device which has queried about emotion information of the video clip.

Figure 9:
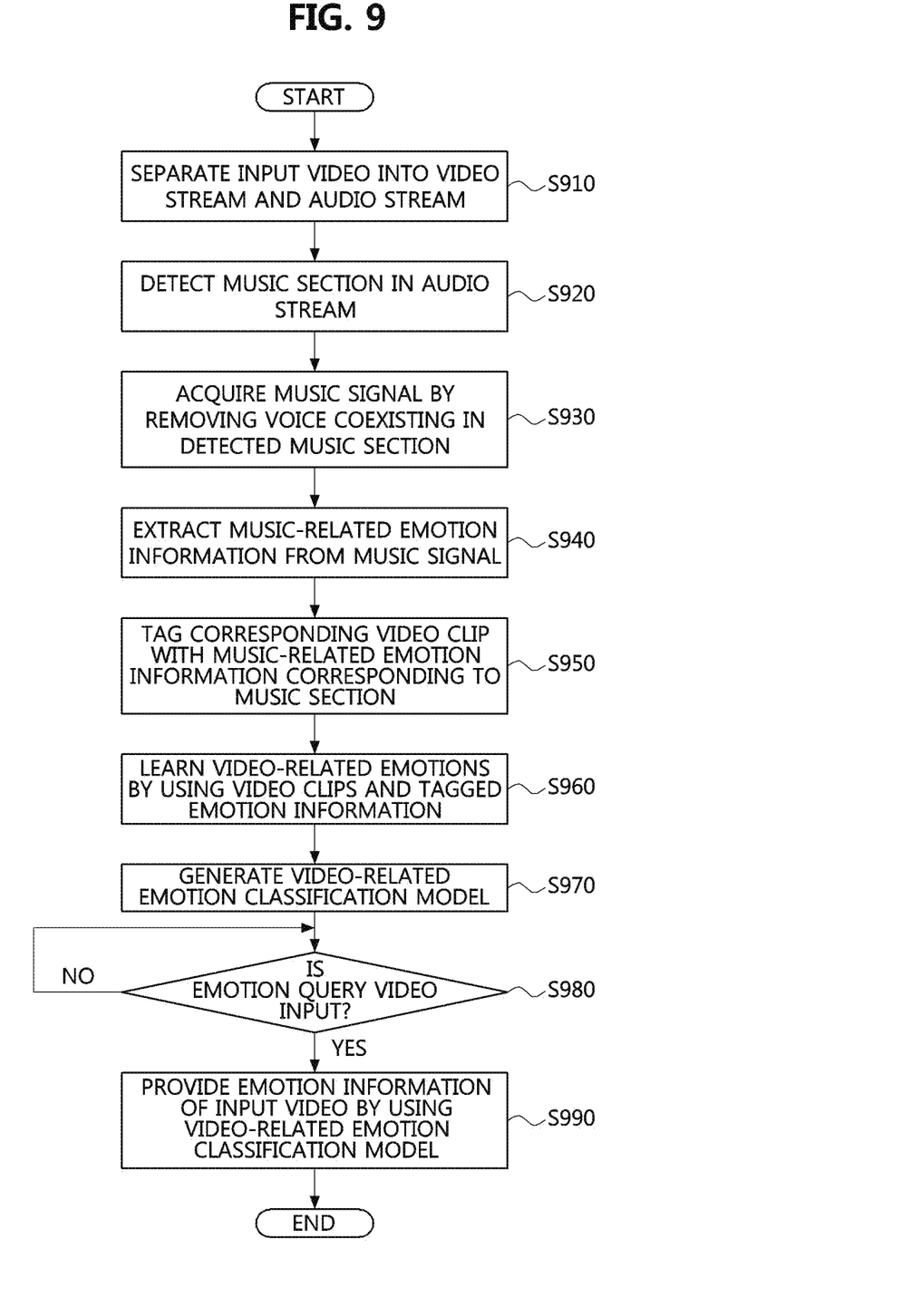
FIG. 9 is an operational flowchart of a method of determining a video-related emotion according to an example embodiment of the present invention.

FIG. 9 is an operational flowchart of a method of determining a video-related emotion according to an example embodiment of the present invention.

An apparatus for determining a video-related emotion first separates an input video into a video stream and an audio stream (S910). Subsequently, the apparatus searches for sections including music by analyzing the separated audio stream, and detects music sections by acquiring running time information of found sections (S920).

The apparatus examines whether voice and music coexist in audio sections determined as the music sections, and acquires a music signal by separating voice and music signals from each other and removing the voice signal when an audio signal in which voice and music coexist has been input (S930).

The apparatus extracts music-related emotion information from the acquired music signal (S940), and tags a video clip corresponding to each music section with music-related emotion information corresponding to the music section (S950)

The apparatus learns video-related emotions by using the video clips and the tagged emotion information (S960), and generates a video-related emotion classification model (S970). Subsequently, when an emotion query video is input from a device including an external device and the like (Yes at S980), the apparatus provides emotion information of the input video by using the video-related emotion classification model (S990).

According to the above-described example embodiments of the present invention, by using existing music-related emotion classifiers, it is possible to easily generate a large amount of training data required for a video-related emotion information classifier in which deep learning is used. According to the current technology, it is difficult to automatically tag video clips with video-related emotion information, and thus a person must view and evaluate video clips one by one. It takes much time and cost for humans to generate a large amount of training data for deep learning. In a related automated technology in which a determination is made by recognizing a person's facial expression when he or she views a video, a large amount of time is consumed and a high error rate occurs.

On the other hand, a method proposed in the present invention makes it possible to automatically generate data for a video-related emotion classifier to perform learning.

In addition, it is possible to accurately determine a video-related emotion by using a video-related emotion information classifier which has learned video-related emotion information by using training data generated according to the present invention.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the example embodiments of the present invention and their advantages have been described in detail, it should be understood that various changes, substitutions and alterations may be made herein without departing from the scope of the invention.

What is claimed is:

1. A method of determining a video-related emotion, the method comprising:
    separating an input video into a video stream and an audio stream;
    analyzing the audio stream to detect a music section;
    extracting at least one video clip matching the music section;
    extracting emotion information from the music section;
    tagging the video clip with the extracted emotion information and outputting the video clip;
    learning video-related emotions by using the at least one video clip tagged with the emotion information to generate a video-related emotion classification model; and
    determining an emotion related to an input query video by using the video-related emotion classification model to provide the emotion.

2. The method of claim 1, wherein the extracting of the emotion information from the music section comprises:
    determining whether the music section includes voice;
    when voice is included in the music section, removing the voice from the music section and acquiring a music signal; and
    extracting music-related emotion information from the acquired music signal.

3. The method of claim 1, wherein the extracting of the at least one video clip matching the music section comprises:
    selecting a video section corresponding to time information of the detected music section; and
    separating the selected video section to generate at least one video clip.

4. The method of claim 1, wherein the tagging of the video clip with the extracted emotion information and the outputting of the video clip comprise inserting the emotion information into a metadata area of the video clip and outputting the video clip.

5. The method of claim 1, wherein the tagging of the video clip with the extracted emotion information and the outputting of the video clip comprise storing the emotion information in a separate file and outputting the video clip and the separate file.

6. The method of claim 1, wherein the tagging of the video clip with the extracted emotion information and the outputting of the video clip comprise inputting the emotion information to an emotion information database.

7. A method of generating video-related emotion training data, the method comprising:
    separating an input video into a video stream and an audio stream;
    detecting music sections in the separated audio stream;
    removing voice from the music sections to acquire music signals;
    extracting music-related emotion information from the acquired music signals; and
    tagging a corresponding video clip with music-related emotion information corresponding to each music section.

8. The method of claim 7, wherein a plurality of video clips tagged with the music-related emotion information are provided as video-related emotion training data.

9. The method of claim 7, further comprising detecting a video section matching each music section, and separating the detected video section to generate a video clip related to at least one scene.

10. The method of claim 7, wherein the music emotion information tagged to the video clip is stored in a metadata area of the video clip, a separate file, or an emotion information database.

11. An apparatus for determining a video-related emotion, the apparatus comprising:
    a processor, and
    a memory configured to store at least one command executed by the processor, wherein the at least one command includes:
a command to separate an input video into a video stream and an audio stream;
a command to detect music sections by analyzing the audio stream;
a command to extract at least one video clip matching the music sections;
a command to extract emotion information from the music sections;
a command to tag the video clip with the extracted emotion information and output the video clip;
a command to learn video-related emotions by using a plurality of video clips tagged with emotion information and generate a video-related emotion classification model; and
a command to determine an emotion related to an input query video by using the video-related emotion classification model and provide the emotion.

12. The apparatus of claim 11, further comprising a database configured to store the plurality of video clips and the plurality of pieces of emotion information related to the plurality of video clips.

13. The apparatus of claim 11, wherein the command to extract the emotion information from the music sections includes:
a command to determine whether the music sections include voice;
a command to, when voice is included in the music sections, remove the voice from the music sections and acquire music signals; and
a command to extract music-related emotion information from the acquired music signals.

14. The apparatus of claim 11, wherein the command to extract the at least one video clip matching the music section includes:
a command to select video sections corresponding to time information of the detected music sections; and
a command to generate at least one video clip by separating the selected video sections.

15. The apparatus of claim 11, wherein the command to extract the at least one video clip matching the music sections includes a command to detect a video section matching each music section and generate a video clip related to at least one scene by separating the detected video section.

16. The apparatus of claim 11, wherein the emotion information tagged to the video clip is stored in a metadata area of the video clip or in a separate file.

17. The apparatus of claim 11, wherein the command to tag the video clip with the extracted emotion information and output the video clip includes:
a command to determine a position in a metadata area to which the emotion information will be inserted by parsing and analyzing the metadata area of the input video; and
a command to insert the emotion information to the determined position in the metadata area.

* * * * *